(12) United States Patent
Nowak et al.

(10) Patent No.: US 8,430,456 B2
(45) Date of Patent: Apr. 30, 2013

(54) STROLLER SEAT ASSEMBLY WITH CALF SUPPORT

(75) Inventors: Hartmut Nowak, Salzkotten (DE); Matthew Ransil, Richland, PA (US)

(73) Assignee: Europe Brands S.A.R.L., Luxembourg (LU)

( * ) Notice: Subject to any disclaimer, the term of this patent is extended or adjusted under 35 U.S.C. 154(b) by 126 days.

(21) Appl. No.: 12/853,116

(22) Filed: Aug. 9, 2010

(65) Prior Publication Data
US 2012/0032490 A1 Feb. 9, 2012

(51) Int. Cl.
*A47C 7/50* (2006.01)
*A47C 20/04* (2006.01)

(52) U.S. Cl.
USPC ................................. 297/423.3; 297/423.26

(58) Field of Classification Search ............. 297/423.26, 297/423.29, 423.3
See application file for complete search history.

(56) References Cited

U.S. PATENT DOCUMENTS

| | | | | |
|---|---|---|---|---|
| 347,428 | A * | 8/1886 | Kline | 297/423.26 X |
| 1,334,771 | A * | 3/1920 | McClary et al. | 297/423.3 |
| 2,308,315 | A * | 1/1943 | Smith | 297/423.26 X |
| 2,466,956 | A * | 4/1949 | Lambert | 297/423.26 X |
| 2,609,862 | A * | 9/1952 | Pratt | 297/423.26 X |
| 2,690,788 | A * | 10/1954 | Ames | 297/423.3 X |
| 2,720,911 | A * | 10/1955 | Lantz | 297/423.3 X |
| 3,072,433 | A * | 1/1963 | Heller et al. | 297/423.26 X |
| 4,391,453 | A * | 7/1983 | Glaser | 297/423.36 X |
| 4,451,082 | A * | 5/1984 | Giordani | 297/90 |
| 4,544,178 | A * | 10/1985 | Al-Sheikh et al. | 280/642 |
| 4,957,303 | A * | 9/1990 | Romatz | 297/423.26 X |
| 6,264,278 | B1 * | 7/2001 | Weimer et al. | 297/423.26 |
| 6,513,827 | B1 | 2/2003 | Barenbrug | |
| 7,066,542 | B2 | 6/2006 | Wang | |
| 7,328,953 | B2 * | 2/2008 | Werschmidt | 297/354.13 |
| 7,377,537 | B2 | 5/2008 | Li | |
| 7,568,758 | B2 * | 8/2009 | Troutman et al. | 297/148 |
| 7,883,145 | B2 * | 2/2011 | Troutman et al. | 297/148 |
| 8,029,053 | B2 * | 10/2011 | Troutman et al. | 297/148 |
| 2006/0071531 | A1 * | 4/2006 | Groth | 297/423.26 |
| 2010/0117315 | A1 | 5/2010 | Yu et al. | |

FOREIGN PATENT DOCUMENTS

| | | |
|---|---|---|
| DE | 3421816 A1 | 12/1985 |
| DE | 9110997 U1 | 11/1991 |
| DE | 100 11 588 | 1/2001 |
| DE | 10 2004 022 843 | 12/2004 |

(Continued)

OTHER PUBLICATIONS

Extended European Search Report counterpart App. No. 10182374.8 dated Sep. 13, 2012.

*Primary Examiner* — Rodney B White
(74) *Attorney, Agent, or Firm* — Lempia Summerfield Katz LLC

(57) ABSTRACT

A stroller seat assembly has a seat bottom with a forward end and a rear end. A calf support is pivotally connected to the seat bottom adjacent the forward end and is pivotable between a lowered position and a raised position. A lock mechanism can, in a locked arrangement, retain the calf support in a selected one of the raised and lowered positions. A release actuator is actuable between a locked position associated with the locked arrangement and a released position that reconfigures the lock mechanism to a released arrangement. The release actuator is gripped and released by one hand of a user whereby the calf support is selectively pivotable toward either of the raised and lowered positions by the same hand.

19 Claims, 4 Drawing Sheets

FOREIGN PATENT DOCUMENTS

| | | |
|---|---|---|
| DE | 20 2004 018 180 | 2/2005 |
| DE | 202004017755 U1 | 3/2005 |
| EP | 567 422 | 10/1993 |
| EP | 519 857 | 1/1995 |
| EP | 1 366 987 | 12/2003 |
| GB | 1583906 A | 10/1977 |
| GB | 2 282 322 | 5/1995 |
| GB | 2 446 236 | 8/2008 |
| WO | WO 93/07039 | 4/1993 |
| WO | WO 2007/053021 | 5/2007 |
| WO | WO 2009/077787 | 6/2009 |
| WO | WO 2009/077788 | 6/2009 |

* cited by examiner

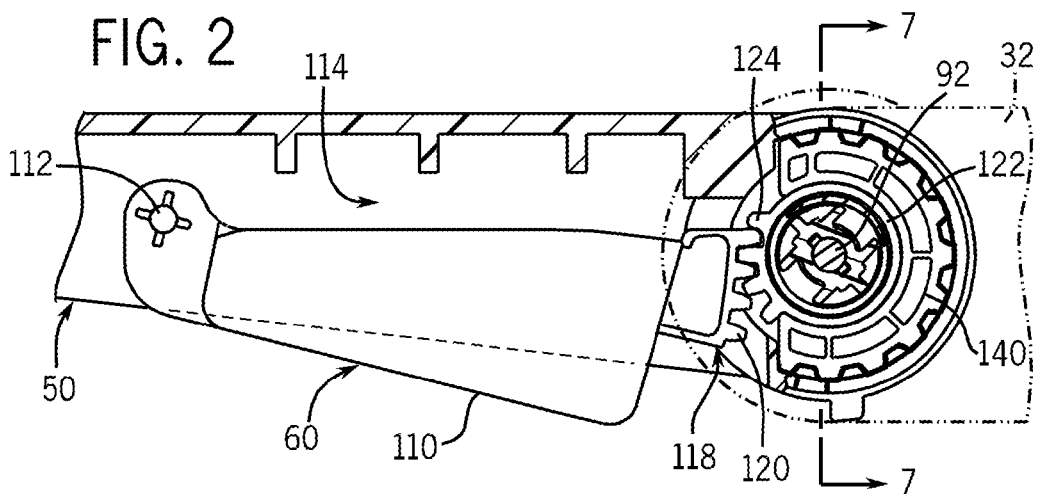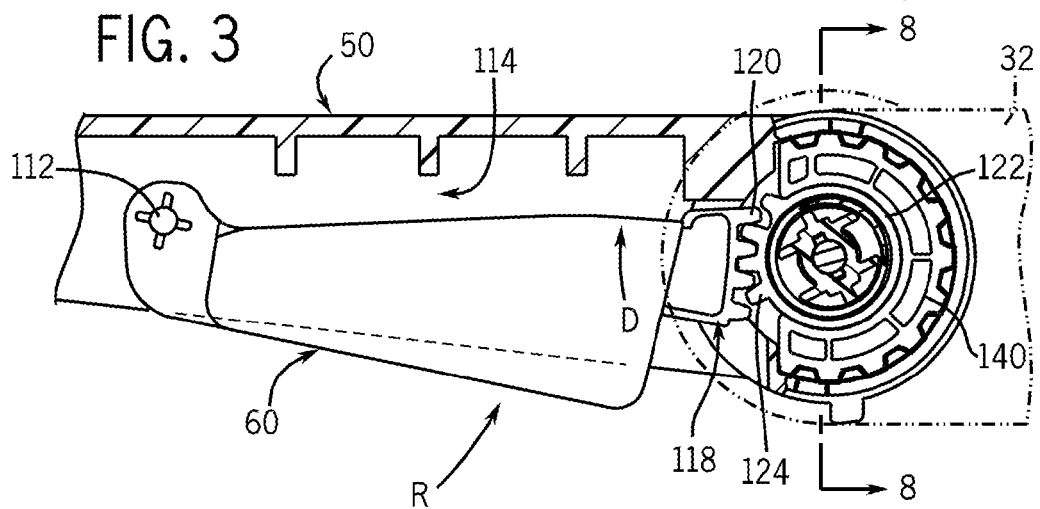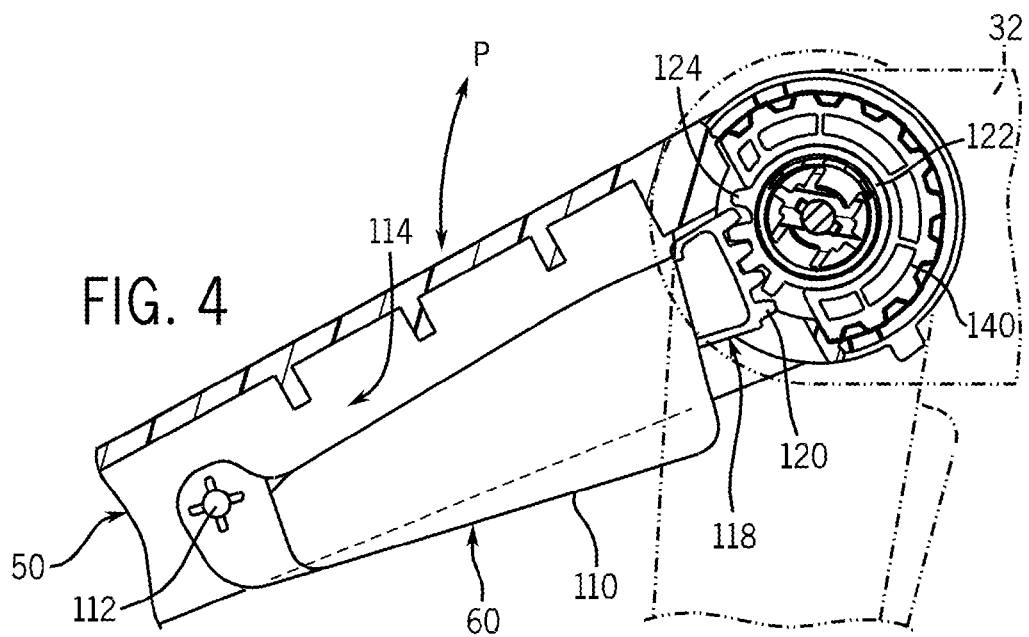

STROLLER SEAT ASSEMBLY WITH CALF SUPPORT

BACKGROUND

1. Field of the Disclosure

The present invention is generally directed to stroller seats, and more particularly to a stroller seat with an adjustable calf support.

2. Description of Related Art

Strollers and stroller seats are known in the art that incorporate a foot rest and that incorporate a calf support. In many examples, the calf support carries the foot rest and is connected to a forward end of the seat bottom of the stroller seat. A typical calf support provides a rest surface between the foot rest and the forward end of the seat bottom to provide comfort to the seat occupant. This type of calf support can support the feet, and calves of a smaller seat occupant, particularly where the occupant's feet can not yet reached the foot rest.

On many strollers of this type, the calf support is adjustable between at least a raised position and a lowered position. The surface of the calf support can generally lie more elevated, parallel, or closer to parallel to the seat surface of the seat bottom in the raised position. The surface of the calf support can lie at a greater downward angle relative to the seat surface and hang or depend more downward from the seat bottom in the lowered position.

A typical calf support is retained in a selected position relative to the seat bottom by lock mechanisms on opposite sides of the seat. Each of the lock mechanisms typically has a button that must be depressed in order to release the individual mechanism. Thus, the caregiver must typically use both hands to release the lock mechanisms before being able to adjust the calf support position. With both hands occupied, it can be difficult, cumbersome, or awkward for the caregiver to then adjust the position of the calf support.

Some stroller seats employ a calf support with a wire that underlies the calf support and connects the lock mechanisms. The wire must be manipulated to release the calf support during adjustment. In one example, some strollers employ such a calf support and wire release mechanism. The wire release mechanism does not operate intuitively. In order to adjust the calf support to the raised position, a user must lift the calf support well beyond its intended raised position, locate the underlying wire, and then lift the wire to set the calf support to the raised position. In order to lower the calf support, the user must again lift the calf support from its current position and then push down on the wire to release the lock mechanisms. The calf support can then be repositioned to the lowered position. The release wire can be actuated using one hand, but the user must first use one hand to lift the calf support prior to adjustment. Thus, the user must typically still use both hands to adjust the position of the calf support because one hand manipulates the wire after their other hand grabs the calf support during adjustment.

SUMMARY

In one example according to the teachings of the present invention, a stroller seat assembly has a seat bottom with a forward end and a rear end. A calf support can be pivotally connected to the seat bottom adjacent the forward end and can be pivotable between a lowered position and a raised position relative to the seat bottom. A lock mechanism can, in a locked arrangement, retain the calf support in a selected one of the raised and lowered positions. A release actuator can be actuable between a locked position associated with the locked arrangement of the lock mechanism and a released position that reconfigures the lock mechanism to a released arrangement. The release actuator is gripped by one hand of a user when actuated to the released position whereby the calf support can be selectively pivoted toward either of the raised and lowered positions by the one hand gripping the release actuator.

In one example of a stroller seat assembly, the lock mechanism and the release actuator can be each positioned on a side of the seat assembly.

In one example of a stroller seat assembly, the lock mechanism and the release actuator can be positioned adjacent one another on the same side of the calf support.

In one example of a stroller seat assembly, the calf support can include first and second sides and can have a lock mechanism at each of the first and second sides coupling the calf support to opposed sides of the seat bottom.

In one example of a stroller seat assembly, the release actuator can be positioned adjacent the lock mechanism on a first side of the calf support and can release the lock mechanism on each of the first and a second side of the calf support.

In one example of a stroller seat assembly, the release actuator can be a lever positioned adjacent a side edge of the calf support. The lever can be pivotable toward a back side or underside of the calf support to the released position.

In one example of a stroller seat assembly, the lock mechanism in the locked arrangement can permit the calf support to move in the direction of the raised position and prevent the calf support from moving in the direction of the lowered position.

In one example of a stroller seat assembly, the lock mechanism can include a ratchet structure that, in the locked arrangement, can permit the calf support to move in the direction of the raised position and can prevent the calf support from moving in the direction of the lowered position.

In one example of a stroller seat assembly, the calf support can include first and second sides. The release actuator can be positioned adjacent the first side. The calf support can also include first and second lock mechanisms. One lock mechanism can be located at each of the first and second sides coupling the calf support to opposed sides of the seat bottom. An axle can extend between the first and second lock mechanisms whereby, in the released position, the release actuator can reconfigure both the first and second lock mechanisms to the released arrangement.

In one example of a stroller seat assembly, the calf support can be retained in one or more selectable intermediate positions between the raised and lowered positions with the lock mechanism in the locked arrangement.

In one example according to the teachings of the present invention, a stroller seat assembly can have a seat bottom with an upward facing seat surface and a forward end. A calf support at the forward end of the seat bottom can be pivotable between a lowered position and a raised position. A one-way lock mechanism, when engaged or in a locked arrangement, can permit raising the calf support but prevent lowering the calf support. A release actuator can release the lock mechanism permitting lowering of the calf support between the raised and lowered positions while still allowing the calf support to be raised as well.

In one example of a stroller seat assembly, the release actuator can be accessed and actuated by one hand of a user and the calf support can be moved by the one hand of the user.

In one example of a stroller seat assembly, the one-way lock mechanism can include a gear that rotates a cam device.

In one example of a stroller seat assembly, an axle can extend transversely across the seat bottom from the one-way lock mechanism to a second one-way lock mechanism.

In one example of a stroller seat assembly, a pivot hub can be provided on each side of the seat bottom. The one-way lock mechanism can be housed within one of the pivot hubs. In one example of a stroller seat assembly, a second one-way lock mechanism housed within the other of the pivot hubs.

In one example of a stroller seat assembly, the release actuator can have gear teeth on one end that mesh with gear teeth on a drive gear positioned on an axis of rotation of the calf support.

In one example of a stroller seat assembly, the lock mechanism can include a drive gear that is coupled to the release actuator and to a drive cam.

In one example of a stroller seat assembly, rotation of a drive cam can release the lock mechanism in a direction along a pivot axis of the calf support.

BRIEF DESCRIPTION OF THE DRAWINGS

Objects, features, and advantages of the present invention will become apparent upon reading the following description in conjunction with the drawing figures, in which:

FIG. 2 shows a cross-section taken along line 2-2 in FIG. 1 of part of the stroller seat assembly including the calf support in a raised position, a release actuator in a locked position, and a lock mechanism in a locked arrangement.

FIG. 3 shows the release actuator in FIG. 2 in a released position.

FIG. 4 shows the calf support in FIG. 3 in an intermediate position and the lowered position.

DETAILED DESCRIPTION OF THE DISCLOSURE

The stroller seat assembly disclosed and described herein solves or improves upon one or more of the above-noted and/or other problems and disadvantages with prior known seat assemblies and calf supports. In one example, the disclosed seat assembly has a calf support that can be both released and then raised or lowered using only one hand. In one example, the disclosed seat assembly has a release mechanism positioned on one side edge of the calf support. In one example, the disclosed seat assembly has a release mechanism that can be released by squeezing with one hand while grasping the calf support. In one example, the disclosed seat assembly can employ two lock mechanisms, one on each side of the calf support. In one example, the disclosed seat assembly can employ one release actuator that can actuate both of the lock mechanisms. These and other objects, features, and advantages of the present invention will become apparent to those having ordinary skill in the art upon reading this disclosure.

Figure 1:
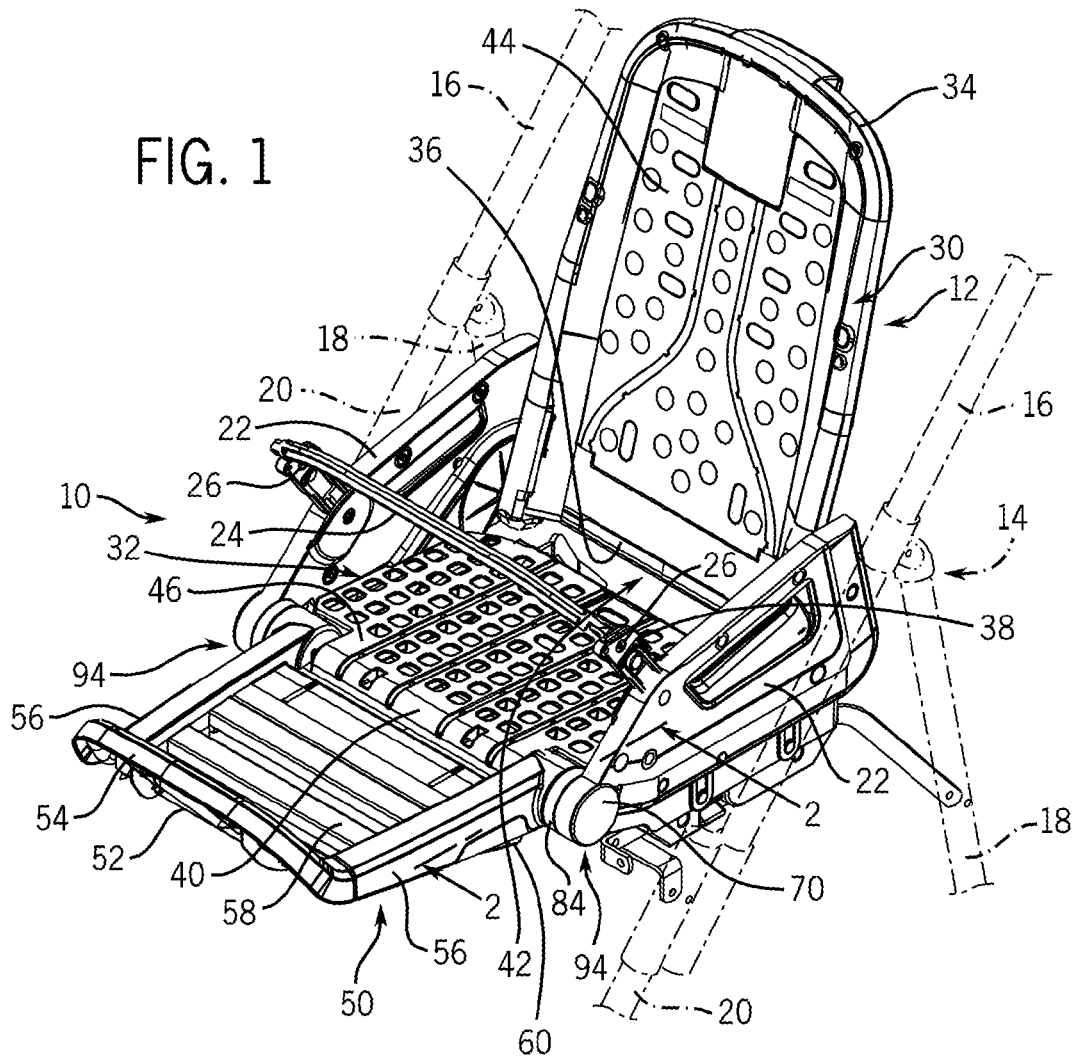
FIG. 1 shows s perspective view of one example of a stroller seat assembly with a calf support constructed in accordance with the teachings of the present invention.

Turning now to the drawings, FIG. 1 shows one example of a stroller 10 and a stroller seat assembly 12 constructed in accordance with the teachings of the present invention. In this example, the stroller 10 is depicted in generic form having a frame 14 shown in dashed line or phantom view. The frame 14 generally has a pair of push bars 16 that extend upward and rearward of the seat assembly 12 to form the stroller handle (not shown) behind and above the seat assembly. The frame 14 also has rear legs 18 and front legs 20, which are also generically represented. Each of the rear legs 18 and front legs 20 would typically carry one or more stroller wheels (not shown) on which the frame 14 would rest and roll during use.

In this example, the stroller 10 includes a pair of armrests 22 positioned on opposite sides of the frame 14. The seat assembly 12 positioned between the armrests 22, which can be either a part of the seat assembly or a part of the frame 14. A structure, such as an arm bar 24 or a child's tray (not shown) traverses the frame 14 and extends across the seat assembly 12, as is known in the art. The structure or arm bar 24 has a pair of opposite or opposed ends 26 that are connected to the armrests 22. Many strollers employ an arm bar, a child tray, or the like that extends across the stroller frame 14 in front of the seat assembly 12. Other components of the stroller 10, such as the front and rear wheels, seat mounting and support parts, ancillary frame and fold joint components, parent trays, cup holders, canopies, storage baskets, handles, and the like are not described or depicted herein. However, the stroller 10 can comprise a wide variety of different features, parts, components, and accessories and yet fall within the spirit and scope of the present invention. As will be evident to those having ordinary skill in the art, the overall design and construction of the stroller 10 on which the seat assembly 12 is deployed can vary considerably from the example disclosed and described herein.

Also as shown in FIG. 1, the seat assembly 12 is illustrated with no soft goods applied to the seat assembly 12 or the frame 14. Instead, the seat assembly and related components can be clearly seen, as they are not hidden or covered by soft goods or other stroller components. In general, the disclosed seat assembly 12 has a seat back 30 and a seat bottom 32. The seat back 30 in this example has an upper end 34 and a lower end 36 as is known in the art. Similarly, the seat bottom 32 has a rear end 38 and a forward end 40 also as is known in the art. The lower end 36 of the seat back 30 and the rear end 38 of the seat bottom 32 are located closely adjacent to one another at a seat bight region 42. With the stroller 10 in an in-use configuration of FIG. 1, the seat back 30 generally has a back support surface 44 on its front or forward facing side. The seat bottom 32 generally has a seat surface 46 on its top or upward facing side when the stroller 10 is in an in-use configuration. As with the overall stroller 10, the configuration and construction of the basic components of the seat assembly 12 can vary considerably and yet fall within the spirit and scope of the present invention.

In the disclosed example, the seat assembly 12 has a calf support 50 as shown in FIG. 1. In this example, the calf support 50 is located adjacent to the forward end 40 of the seat bottom 32. The calf support 50 generally has one end pivotally coupled to part of the seat assembly 12 or stroller 10 and has an opposite free end 52. A foot rest 54 is disposed at the free end 52 and is formed by a portion of the calf support free end 52 protruding at an angle and extending forward from the calf support. The calf support 50 has a pair of side edges 56 and a support structure 58 extending between the side edges 56, the foot rest 54, and the one end. In the disclosed example, the calf support 50 is pivotally coupled to the forward end of the seat bottom 32, and at least in part, to a forward end of the armrests 22. As will be evident to those having ordinary skill in the art upon reading this disclosure, the calf support 50 can be connected or coupled to the seat bottom 32, the armrests 22, and/or some other part of the frame 14 on the stroller 10. However, in the disclosed example, the armrests 22 and the calf support 50 are provided as a part of the seat assembly 12.

The calf support 50 generally has a release actuator 60 positioned along the left side edge 56 as shown in FIGS. 1 and 2. The release actuator 60 can be actuated in the direction of the arrow R (see FIG. 3), as described in greater detail below, in order to release the calf support and permit adjusting the position of the calf support 50 in the direction of the arrow P (see FIG. 4). The calf support 50 is shown in FIGS. 1 and 2 in a raised position. The actuator 60 can be actuated as depicted in FIG. 3 in order to lower the calf support 50 from the raised position to at least one lowered position as depicted in FIG. 4. In one example, the calf support 50 can be configured so that it is either adjustable to one or more intermediate positions (see FIG. 4) or adjustable only between the raised and lowered positions. In one example, the calf support 50 can be configured (as in the disclosed example) so that it can be lifted in the direction of the raised position without having to actuate the release actuator 60. In another example, the calf support 50 can be configured so that it can not be raised or lowered unless the release actuator 60 is actuated.

Figure 5:
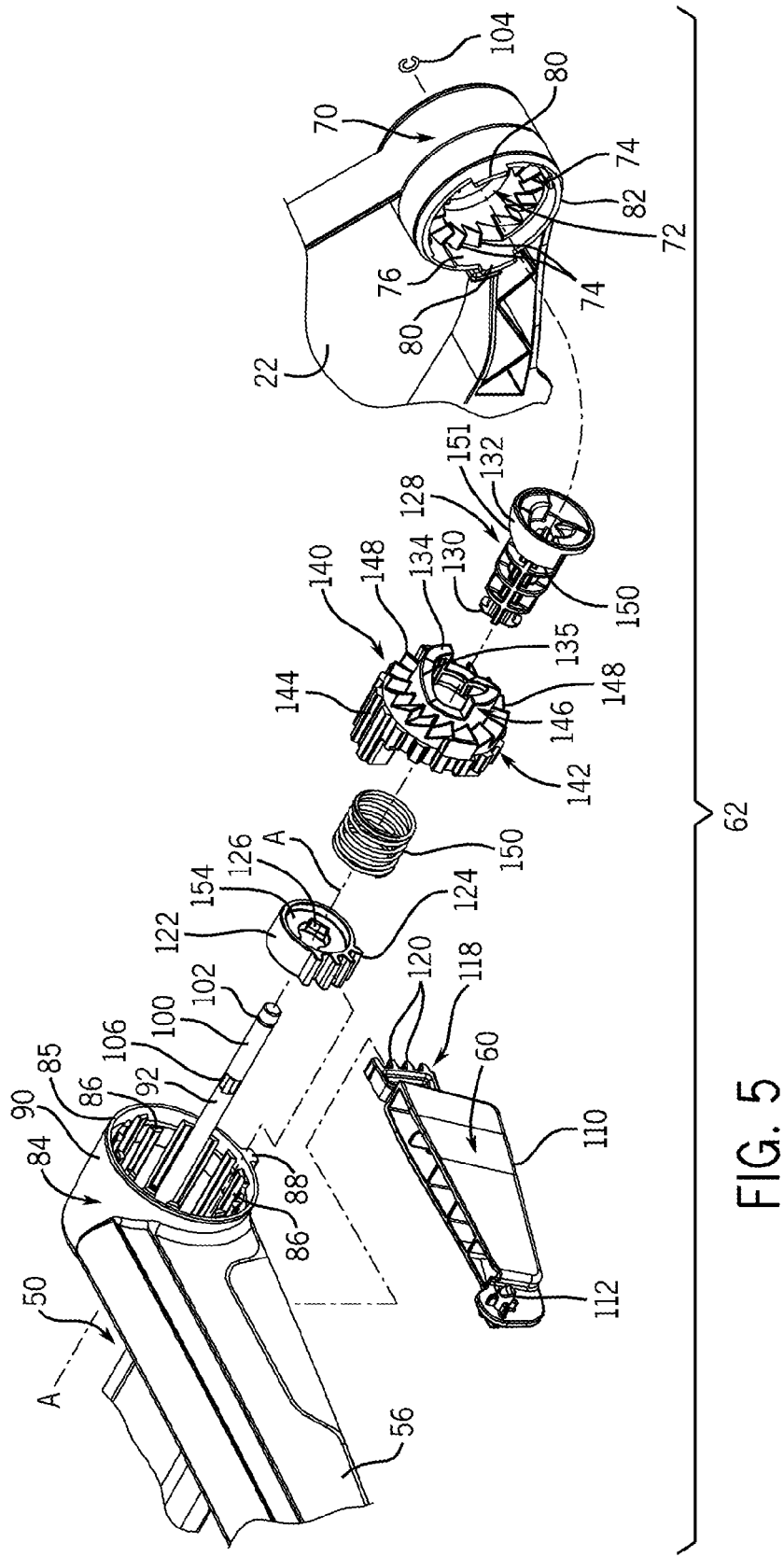
FIG. 5 shows an exploded view of a portion of the seat assembly and calf support of FIG. 1.

FIG. 5 shows an exploded view of the parts of the seat assembly 12 that form a lock mechanism 62 of the calf support 50. The exploded view is provided to better illustrate the construction and function of the calf support 50 and lock mechanism 62 as disclosed herein. In this example, portions of the left and right sides of the calf support 50, including the lock mechanisms 62, are minor images of one another. In that regard, only the left side components of the lock mechanisms 62 are described herein and depicted in the drawings. Any differences between the two sides will be expressly described and discussed below. Otherwise, one can assume that the components of the lock mechanism 62 on the right side mirror those described for the left side.

In this example, an outer hub section 70 is depicted in FIG. 2 and is provided on the forward end of the left side armrest 22. The outer hub section 70 has an open interior that creates a socket 72 within the hub section. The socket 72 faces inward toward the seat assembly 12. A plurality of face gear teeth 74 are exposed within the socket 72 and are carried on and extend around an interior circumferential surface 76 of the socket. As noted above, the outer hub section 70 can be provided as a part of the seat bottom 32 or the frame 14 instead of the armrest 22. An inner facing end 82 of the outer hub section 70 has a stepped configuration. Two travel stop limiters or stop tabs 80 are diametrically opposed from one another and project in an inward direction from the inner facing edge or end 82 on the hub section 70.

An inner hub section 84 is provided on the side edge 56 at the one end of the calf support 50. The inner hub section 84 also has an open interior space or socket that opens outwardly facing the outer hub section 70. The inner hub section also has an outer facing end or edge 85 that faces in the direction of the outer hub section 70 when assembled. An interior surface 86 within the socket of the inner hub section 84 is splined. The splines or grooves extend in an axial orientation. The inner hub section 84 has a stop tooth 88 that projects radially outward from an exterior surface 90 of the hub section.

The inner hub section 84 and the outer hub section 70 on each side of the seat assembly 12 are joined to one another as depicted in FIG. 1. The combined hubs 70, 84 form a pivot hub 94 on each side of the calf support 50. In the disclosed example, the outer hub section 70 is essentially a fixed hub section and the inner hub section 84 moves with the calf support 50. When assembled, the exposed edges 82 and 85 of the hub sections 70 and 84 abut one another (see FIGS. 7 and 8). The stop tooth 88 will be positioned or captured between the two stop tabs 80. The stop tooth 88 will contact one of the stop tabs 80 when reaching the fully raised position of FIGS. 1 and 2 and will contact the other of the stop tabs when reaching the fully lowered position depicted in phantom view in FIG. 4. The stop tooth and stop tabs define the full or maximum range of travel of the calf support 50 in this example.

An axle 92 extends laterally across the seat assembly 12 through an axle bore (not shown) in the forward end 40 of the seat bottom 32. The axle 92 defines a rotation axis A for the calf support 50 and the lock mechanism 62 in this example. One end 100 of the axle 92 extends through a center of the inner hub section 84 and the outer hub section 70 when the pivot hub 94 is assembled. The end of the axle 92 has a groove 102 for receiving a spring clip or C-clip 104 to secure the axle when assembled (see FIGS. 6-8). The surface of the axle 92 is cylindrical, except for a keyed section 106 that is spaced inboard from the groove 102 at the end 100 of the axle. The keyed section 106 is positioned within the interior of the pivot hub 94 when the hub sections 70 and 84 are assembled.

As shown in FIG. 5, the release actuator 60 in this example is an elongate body defining a grip surface 110 along one lengthwise edge. One end of the elongate body has a pivot axle or pin 112. The release actuator 60 is pivotally connected via the pivot axle 112 to the left side edge 56 of the calf support 50. The elongate body of the release actuator 60 is received within a pocket 114 in the backside or underside of the calf support 50. The grip surface 110 is exposed for grasping by a user. The release actuator 60 can be squeezed into the pocket 114 to a release position during actuation (see FIG. 3). The configuration and construction of the release actuator 60 and its connection to the calf support 50 can vary from the disclosed example. For example, the pocket 114 can be eliminated and the actuator can be coupled to the side edge 56 on an exterior side of the support.

A gear segment 118 has a plurality of teeth 120 and projects lengthwise from the end of the release actuator 60 opposite the pin or pivot axle 112. A drive gear 122 is received near the one end 100 of the axle 92 and positioned inboard of the keyed section 106 in this example. The drive gear 122 has a plurality of complementary teeth 124 projecting radially outward from a segment of its circumference. The complementary teeth mesh with and engage the teeth 120 on the gear segment 118 at the end of the release actuator 60. A keyed opening 126 is located through the center of the drive gear 122. The axle 92 passes through the keyed opening 126.

Figure 6:
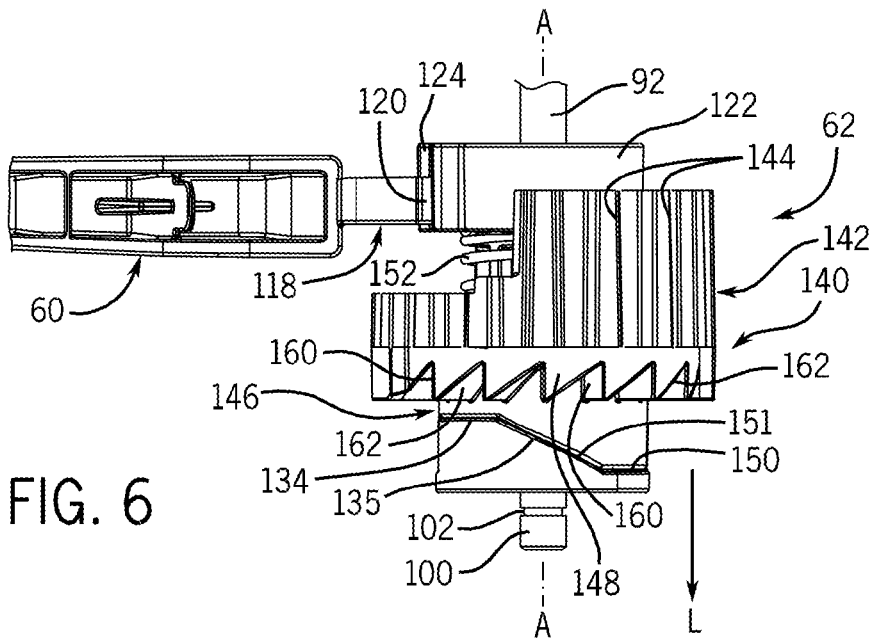
FIG. 6 shows a top assembled view of parts of a lock mechanism and release for the calf support in FIGS. 1 and 5.

A drive cam 128 has an elongate body and is also received on the axle 92, which extends lengthwise through the body of the drive cam. An inner end of the drive cam 128 has a key 130 that projects lengthwise from the end of the cam. The key 130 is shaped and sized to fit forcibly through and register with the keyed opening 126 in the drive gear 122 to secure the drive gear to the end of the drive cam. The complementary shape of the key 130 and the keyed opening 126 rotationally fix the drive cam 128 and drive gear 122. Thus, the drive cam 128 and drive gear 122 are fixed to one another for rotation about the axis A of the axle 92. FIGS. 5 and 6 show a cylindrical drum 132 formed at the other, outer end of the drive cam 128. An inner facing edge of the drum 132 has a stepped surface 134 that faces in the direction of the drive gear 122. A portion of the surface 134 is angled creating a cam or ramp surface 135.

As shown in FIGS. 5 and 6, the lock mechanism 62 has a lock gear 140 with a dual diameter, cylindrical body. The axle 92 also passes through a center of the lock gear 140. A larger diameter body segment 142 of the lock gear 140 body has an exterior circumferential surface 144 is splined. The splines of the surface 144 are oriented lengthwise and configured to mate with the splines on the interior surface 86 of the inner hub section 84. The splined surfaces 144 and 86 prevent the lock gear 140 from rotating relative to the inner hub section 84 about the axis A, but permit axial translation or sliding of the lock gear along the axis A within the interior of the assembled pivot hub 94. A smaller diameter body segment 146 of the lock gear 140 body is arranged coaxially with the larger body segment 142 but is axially misaligned relative to the larger body segment (see FIGS. 5 and 6). In the disclosed example, the smaller body segment 146 projects in an outward direction from the larger segment 142 toward the outer hub section 70.

A plurality of lock teeth 148 are formed to define a face gear and are positioned on the outward facing edge of the larger body segment 142. A stepped surface 150 is formed on the outward facing edge of the smaller diameter segment 146 of the lock gear 140 body. A portion of the stepped surface 150 is angled creating a cam or ramp surface 151. The diameter of the smaller diameter segment 146 is sized to coincide with the diameter of the drum 132 on the drive cam 128. The corresponding ramp services 134 and 150 abut one another as shown in FIG. 6. A lock spring 152 is sandwiched between the lock gear and the drive gear. The spring 152 is positioned having one end borne against a face 154 of the drive gear 122. The other end of the lock spring 152 is borne against an interior face 156 of the lock gear 140 (see FIG. 7). The drive gear 122 is axially fixed and the lock gear 140 is axially slidable. The lock spring 152 thus biases the lock gear 140 in an outward direction of the arrow L when the lock mechanism is in a locked arrangement (see FIGS. 2, 6, and 7). In the locked arrangement, the stepped surfaces 134 and 150, including the ramp or cam surfaces 135 and 151, are biased against one another by the spring 152. Likewise, the lock teeth 148 on the lock gear 140 are biased into engagement and mesh with the face gear teeth 74 on the outer hub section 70.

Figure 7:
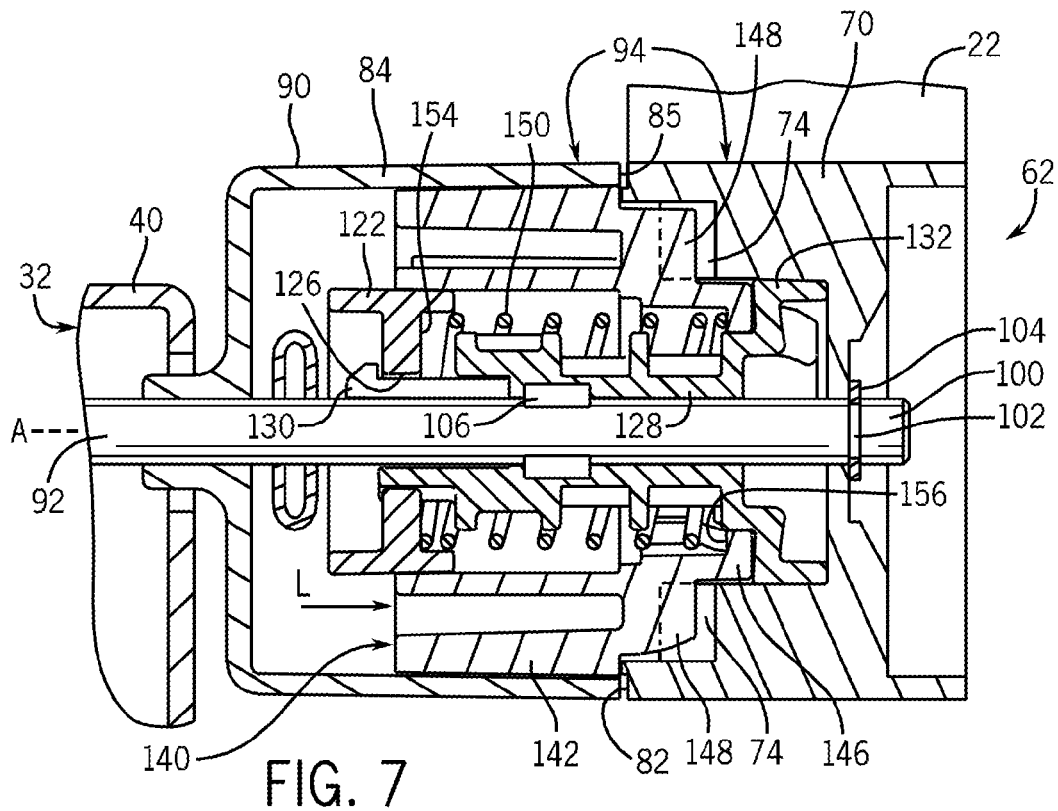
FIG. 7 shows a cross-section taken along line 7-7 in FIG. 2 of the lock mechanism in the locked arrangement.

The function and operation of the lock mechanism 62 is now described with general reference to FIGS. 2-4 and 6-8. FIGS. 2, 6, and 7 show the lock mechanism 62 in the locked arrangement. In this arrangement, the lock spring 152 biases the lock gear 140 into engagement with the drive cam 128. The drive cam 128 has a shaped way within its axle bore (not shown) that engages the keyed section 106 on the axle 92. This fixes the drive cam 128 rotationally to the axle 92. Since the drive cam 128 and the drive gear 122 are also fixed rotationally (by the keyed opening 126 and the key 130), the drive gear is also fixed rotationally relative to the axle 92. The release actuator 60 is actuated by squeezing the actuator in the direction of the arrow R (see FIG. 3) into the pocket 114. This causes the release actuator 60 to rotate about its pivot axle or pin 112. The gear segment 118 at the opposite end of the release actuator 60 thus moves upward or toward the pocket 114. The teeth 120 of the gear segment 118 engage the complementary teeth 124 on the drive gear 122. Thus, rotation of the release actuator 60 rotates the drive gear 122 in the direction of the arrow D (see FIG. 3), which in turn rotates the drive cam 128 in the same direction about the axis A.

Figure 8:
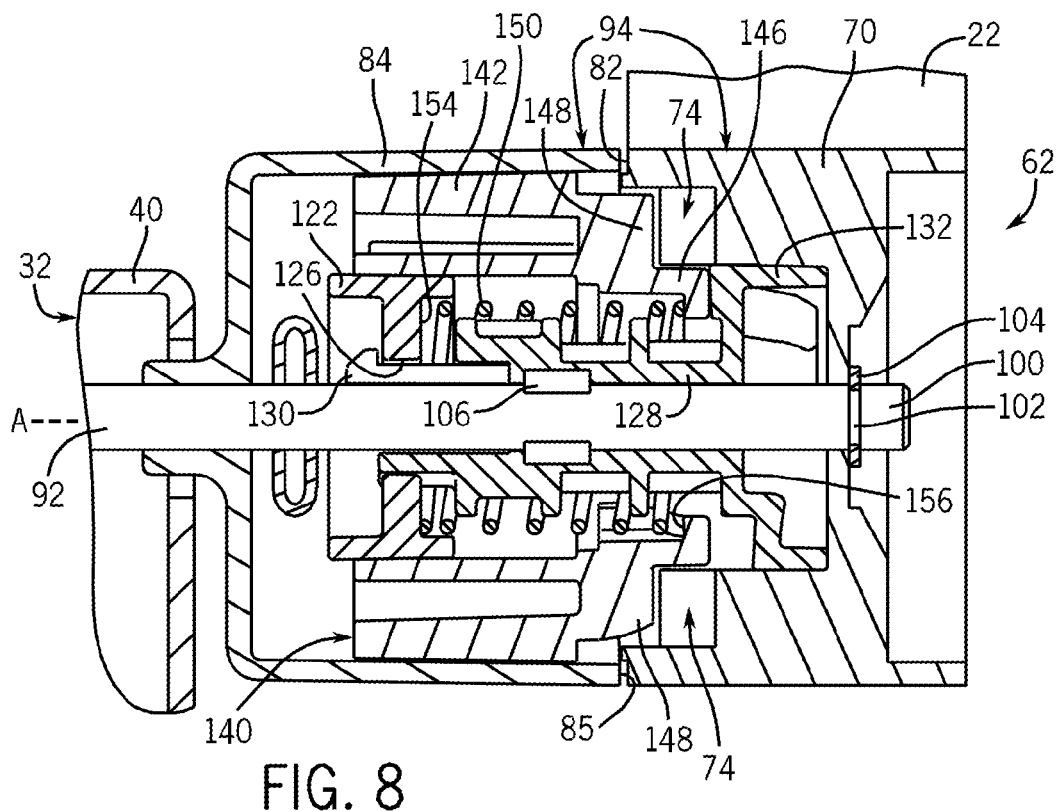
FIG. 8 shows a cross-section taken along line 8-8 in FIG. 3 of the lock mechanism in the released arrangement.

With reference to FIG. 6, rotation of the drive cam 128 rotates the smaller diameter segment 146 of the cam body. This drives the angled cam surface 151 of the stepped surface 150 against the angle cam surface 135 of the stepped surface 134. The orientation of the cam surfaces 135, 151 drives the lock gear 140 axially inward in a direction opposite the arrow L as shown in FIG. 8. Movement of the lock gear 140 in this direction disengages the lock teeth 148 from the face gear teeth 74. This releases the lock mechanism 62 to a released arrangement (see FIGS. 3, 4, and 8), allowing rotation of the calf support 50 in either direction (see arrow P) about the axis A. The calf support 50 can then be moved in either direction toward the raised or lowered positions.

To actuate the release actuator 60, a user need only grasp the side edge 56 of the calf support 50 and squeeze the actuator into the pocket 114. At the same time, the user can retain their grasp on the side edge 56 and easily move the calf support 50 to the desired position. Thus, the user requires only one hand to both release the lock mechanism 62 and readjust the position of the calf support 50 at the same time. Operation of the calf support 50 and lock mechanism 62 as disclosed herein is much more intuitive and is simpler and easier than prior known calf support devices.

Once the calf support 50 is moved to the desired position, the user can release or let go of the release actuator 60. The lock spring 152 will force the lock gear 140 back in the direction of the arrow L to the locked arrangement. The ramp surface 134 will push against the ramp surface 151 under force of the lock spring 152. This will rotate the drive cam 128 and, thus, the drive gear 122 in the reverse direction of the arrow D. The complementary teeth 124 and gear segment 118 will then force the release actuator 60 to return to its released position (see FIG. 2). If desired, a secondary, optional spring (not shown) can be employed to directly bias the release actuator 60 away from the pocket 114 and assist in operation of the lock mechanism 62.

The face gear teeth 74 and the lock teeth 148 each extend around the entire circumference of their respective outer hub section 70 and lock gear 140. Thus, these gear teeth can engage in virtually any rotational orientation relative to one another. With reference to FIGS. 3 and 4, when the release actuator 60 is in the released position, the user can pivot the calf support 50 about the axis A in the direction of the arrow P. The inner hub section 84, lock gear 140, drive gear 122, and drive cam 128 all rotate in unison. Since the axle 92 is rotationally keyed to the drive cam 128 and drive gear 122, the axle will also rotate about the axis A as the release actuator 60 is actuated and as the calf support 50 is pivoted. The other end of the axle 92 can have a similar construction to the one end 100 and can be keyed to another drive cam and drive gear within the right side pivot hub 94. Rotation of the axle 92 can thus be used to rotate a right side drive cam and drive gear constructed identically to, or as minor images of the drive cam 128 and drive gear 122 on the left side. The right side lock mechanism can also include a lock gear with lock gear teeth and face gear teeth within the hub 94 that are also either identical to, or a minor image of, the corresponding left side components described above. Thus, actuation of the single release actuator 60 as disclosed herein can operate both a left side lock mechanism 62 and a similar or identical right side lock mechanism within the right side pivot hub 94. In the disclosed example, the right side need not have a release handle and the drive gear need not have complementary teeth, since the drive gear will be driven by rotation of the axle 92 from the left side of the calf support.

In the disclosed example, the individual teeth 74 and 148 are constructed to provide a ratchet-type engagement. One face 160 on each tooth 74, 148 is essentially vertical, nearly parallel to the axis A, or can even be undercut. The opposite face 162 on each individual tooth 74 and 148 is oriented at a relatively steep angle. With the lock gear 140 engaged, the lock gear cannot rotate in the direction of the gear teeth faces 160, i.e., the calf support 50 cannot be rotated downward. It is these tooth surfaces 160 that will retain the calf support 50 in position during use and not permit the calf support to pivot downward. If undercut, downward pressure on the calf support 50 will further mesh and engage the teeth. This allows the calf support 50 to support the weight of a seat occupant's legs.

However, with the lock gear 140 engaged, the calf support 50 can still be rotated upward. The lock gear 140 can rotate in the direction of the angled gear teeth faces 162. The angle of the faces 162 define ramp surfaces permitting the faces 162 on the lock gear 140 to ride up the faces 162 on the face gear teeth 74 against the bias of the lock spring 152. When the calf support 50 is stationary, the lock spring 152 will bias the lock gear 140 back into engagement in the lock arrangement. As noted above, the face gear teeth 74 and the lock gear teeth 148 can be configured to prevent motion of the calf support 50 in either direction P with the left and right side lock mechanisms in the locked arrangement.

The number and spacing of the teeth 74, 148 can also define multiple intermediate calf support positions between the raised position and lowered position defined by the location of the stop tabs 80. The calf support 50 can be pivoted to and positioned in any desired position within the range of the stop tabs 80 by as little as one tooth width in this example.

In an alternative embodiment, the calf support 50 need not employ a right side lock mechanism. Instead, the right side pivot hub 94 can simply provide a pivot joint allowing the right side of the calf support 50 to rotate as needed. However, two lock mechanisms can provide a more stable product during use, which can aid in holding a selected calf support position. It is also possible that a second release actuator 60 could be provided on the right hand edge 56 of the calf support 50. Either one of the release actuators could then be used to release both lock mechanisms. This would allow the user to grasp either side of the calf support according to their current circumstances, to release and adjust. It is also possible that the disclosed release actuator 60 could be repositioned at a different location on the calf support 50 and yet function as intended. The disclosed side edge location of the release actuator 60 provides a very clean lock mechanism design as well as very intuitive operation for both releasing and adjusting the calf support position.

The disclosed seat assembly 12 provides a means of connecting a pivotable actuation lever or release actuator to a rotating cam device that creates axial motion of a gear to release the lock mechanism. The disclosed lever or release actuator is pinned on one end and transfers the rotational motion of the lever to the cam through gear teeth. The disclosed seat assembly also provides a means of connecting the rotational motion from a cam and lock mechanism on one side of the calf support to a cam and lock mechanism on the other side simply through rotation of the calf support axle. This allows actuation of the release actuator or lever on one side to simultaneously release the lock gears on both sides.

There are a number of alternative ways in which to connect a pivotable release actuator or lever to an axial motion cam and/or gear set. For example, the lock mechanism could employ one or more cables, belts, linkages, electro-mechanical devices, rack and pinion gears, bevel gears, or the like. As disclosed herein, the above-disclosed calf support has a lock mechanism with gears fixed to the calf support, except that the lock gears can move axially. It is also possible to devise a lock mechanism where the lock gear is fixed to part of the seat assembly or the frame and can become disengaged from the calf support.

Although certain seat assembly and calf support devices and mechanisms have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller seat assembly comprising:
    a seat bottom having a forward end and a rear end;
    a calf support pivotally connected to the seat bottom adjacent the forward end and pivotable between a lowered position and a raised position relative to the seat bottom;
    a lock mechanism on one end of the calf support, the locking mechanism having a lock gear biased into engagement with a drive cam, the lock gear adapted to lockingly engage a hub on the forward end of the seat bottom and adjacent a side edge at one end of the calf support, in a locked arrangement, retaining the calf support in a selected one of the raised and lowered positions; and
    a pivotable release actuator on the seat assembly actuable between a locked position associated with the locked arrangement of the lock mechanism and a released position that reconfigures the lock mechanism to a released arrangement,
    wherein the release actuator is squeezed and pivoted inward by one hand of a user when actuated to the released position, releasing the lock gear from engagement with the hub, whereby the calf support is selectively pivotable toward either of the raised and lowered positions by the one hand simultaneously squeezing the release actuator.

2. A stroller seat assembly according to claim 1, wherein the lock mechanism and the release actuator are each positioned on a side of the seat assembly.

3. A stroller seat assembly according to claim 2, wherein the lock mechanism and the release actuator are positioned adjacent one another on the same side of the calf support.

4. A stroller seat assembly according to claim 1, wherein the calf support further comprises:
    first and second sides; and
    a lock mechanism at each of the first and second sides coupling the calf support to opposed sides of the seat bottom.

5. A stroller seat assembly according to claim 4, wherein the release actuator is positioned adjacent the lock mechanism on the first side of the calf support and can release the lock mechanism on each of the first and second sides.

6. A stroller seat assembly comprising:
    a seat bottom having a forward end and a rear end;
    a calf support pivotally connected to the seat bottom adjacent the forward end and pivotable between a lowered position and a raised position relative to the seat bottom;
    a lock mechanism that can, in a locked arrangement, retain the calf support in a selected one of the raised and lowered positions; and
    a pivotable release actuator on the seat assembly actuable between a locked position associated with the locked arrangement of the lock mechanism and a released position that reconfigures the lock mechanism to a released arrangement,
    wherein the release actuator is squeezed and pivoted inward by one hand of a user when actuated to the released position whereby the calf support is selectively pivotable toward either of the raised and lowered positions by the one hand simultaneously squeezing the release actuator, and
    wherein the release actuator is a lever positioned adjacent a side edge of the calf support, the lever being squeezed into a pocket on the seat assembly and toward a back side of the calf support to the released position.

7. A stroller seat assembly according to claim 1, wherein the lock mechanism in the locked arrangement permits the calf support to move in the direction of the raised position and prevents the calf support from moving in the direction of the lowered position.

8. A stroller seat assembly according to claim 1, wherein the lock mechanism includes a ratchet structure that, in the locked arrangement, permits the calf support to move in the direction of the raised position and prevents the calf support from moving in the direction of the lowered position.

9. A stroller seat assembly according to claim 1, wherein the calf support further comprises:
   first and second sides, the release actuator positioned adjacent the first side;
   first and second lock mechanisms, one at each of the first and second sides coupling the calf support to opposed sides of the seat bottom; and
   an axle extending between the first and second lock mechanisms whereby, in the released position, the release actuator reconfigures both the first and second lock mechanisms to the released arrangement.

10. A stroller seat assembly according to claim 1, wherein the calf support can be retained in one or more selectable intermediate positioned between the raised and lowered positions with the lock mechanism in the locked arrangement.

11. A stroller seat assembly comprising:
   a seat bottom having an upward facing seat surface and a forward end;
   a calf support at the forward end of the seat bottom and pivotable between a lowered position and a raised position;
   a one-way lock mechanism that, when engaged in a locked configuration, permits raising the calf support but prevents lowering the calf support; and
   a release actuator on the seat assembly actuable to release the lock mechanism permitting lowering, while still permitting raising, of the calf support between the raised and lowered positions.

12. A stroller seat assembly according to claim 11, wherein the release actuator can be accessed and actuated by one hand of a user and the calf support can be moved by the one hand of the user to a selected position requiring only one hand to both release the lock mechanism and readjust the position of the calf support at the same time.

13. A stroller seat assembly according to claim 11, wherein the one-way lock mechanism further comprises a gear that rotates a cam device.

14. A stroller seat assembly according to claim 11, further comprising an axle extending transversely across the seat bottom from the one-way lock mechanism to a second one-way lock mechanism.

15. A stroller seat assembly according to claim 11, further comprising a pivot hub on each side of the seat bottom, the one-way lock mechanism housed within one of the pivot hubs.

16. A stroller seat assembly according to claim 15, further comprising a second one-way lock mechanism housed within the other of the pivot hubs.

17. A stroller seat assembly according to claim 11, wherein the release actuator has gear teeth on one end that mesh with gear teeth on a drive gear positioned on an axis of rotation of the calf support.

18. A stroller seat assembly according to claim 17, wherein the drive gear is coupled to a drive cam.

19. A stroller seat assembly according to claim 18, wherein rotation of the drive cam releases the lock mechanism in a direction along a pivot axis of the calf support.

* * * * *